United States Patent

[11] 3,625,745

[72] Inventors Archibald N. Wright;
Hans-Dieter Becker, both of Schenectady, N.Y.
[21] Appl. No. 20,817
[22] Filed Mar. 18, 1970
[45] Patented Dec. 7, 1971
[73] Assignee General Electric Company

[54] ANTITHROMBOGENIC ARTICLE AND PROCESS
13 Claims, No Drawings

[52] U.S. Cl. .................................................. 117/93.31,
3/1, 3/DIG. 1, 3/DIG. 3, 117/121, 128/334,
128/335.5, 117/127, 424/31, 424/39
[51] Int. Cl. ............................................... B44d 1/50
[50] Field of Search ........................................ 117/93.31;
128/334, 335.5; 3/1, DIG. 1, DIG. 3; 424/31, 32,
33, 39

[56] References Cited
UNITED STATES PATENTS
3,453,194 7/1969 Bennett et al. ............... 117/93.31 X
3,508,959 4/1970 Krahnke ....................... 3/1
3,511,684 5/1970 Huffaker ....................... 3/1

Primary Examiner—Alfred L. Leavitt
Assistant Examiner—J. H. Newsome
Attorneys—Charles T. Watts, Paul A. Frank, Jean M.
Binkowski, Frank L. Neuhauser, Oscar B. Waddell and
Joseph B. Forman

ABSTRACT: A thin, continuous adherent coating is formed on a substrate by ultraviolet surface photopolymerization of a synthetic organic antithrombogenic compound in the gaseous phase. The resulting coated article exhibits antithrombogenic behavior and is suitable for prosthetic use.

ANTITHROMBOGENIC ARTICLE AND PROCESS

This invention relates to the art of producing antithrombogenic articles suitable for use in blood transporting equipment and as prosthetic material. In one particular aspect, the present invention is directed to a single-step deposition of an adherent coating of a photopolymerized antithrombogenic material on a substrate.

Blood normally clots whenever it touches a foreign surface. With the increasing use of prosthetic materials and blood-transporting equipment, there is now a wide search for suitable materials with which blood can be contacted without having undesirable effects on the blood or the prosthetic material itself. Conventional plastics and resins, including highly inert materials such as silicones, are not suitable for long term contact with blood because they are too thrombogenic, that is they promote deposition of platelets and thus the formation of blood clots. Numerous treatments to modify the surfaces of various plastics have been carried out to inhibit coagulation of blood or other undesirable phenomena but none of the treated materials has functioned satisfactorily due largely to thrombus formation on their surfaces. A thrombus is a fibrinous clot formed in thrombosis.

It is an object of the present invention to provide adherent, continuous coatings from antithrombogenic compounds which retain some of the biological properties of the initial compounds.

It is another object of this invention to provide such coatings through a process which is easy and economical to carry out and which consistently produces coatings of good quality.

Briefly stated, the process of the present invention comprises providing an antithrombogenic compound or material in the form of a vapor in the presence of a substrate. The vapor is subjected to ultraviolet light to coat the substrate by surface photopolymerization.

Synthetic organic antithrombogenic compounds are used to form the polymer coatings of the present invention. The term antithrombogenic compound includes anticoagulant compounds which inhibit or prevent the formation of thrombi. Representative of these compounds are bishydroxycoumarin sold under the trademark Dicumarol, ethyl biscoumacetate sold under the trademark Tromexan, 3-(alpha-acetonyl-benzyl)-4-hydroxycoumarin known generally as warfarin, and 1,3-indanedione compounds such as 2-phenyl-1,3-indanedione, 2-diphenylacetyl-1,3-indanedione, and 2[p-(phenylsulfonyl) phenyl]-1,3-indanedione and its tautomer disclosed in U. S. Pat. No. 3,356,732 issued Dec. 5, 1967.

In the present invention, the term antithrombogenic compound also includes synthetic organic compounds which contain functional groups with fibrinolytic activity. Fibrinolysis is that process by which blood clots can be dissolved and hence the overall thrombosis reversed. The functional groups of these compounds may themselves be active, or function by inducing enzyme activity. Representative of such fibrinolytic compounds are $\epsilon$-aminocaproic acid, p-aminobenzoic acid, salicylic acid, derivatives of benzoic acid such as aspirin, diphenyldioxopyrazolidine derivatives such as phenylbutazone, indol derivatives, corticoids, urethanes, dextran, antihistamines such as chlorpheniramine, dipyridamole sold under the trademark Persantin.

Many of the antithrombogenic compounds useful in the present invention may be vinylsubstituted, whereby fast rates of photosurface polymerization can be accomplished and the biologically active sites of these compounds are retained as such in the coating.

It is believed that since ultraviolet light is used in the instant process, which is light of extremely short wave length, the resulting coatings retain a significant portion of the biological properties of the initial substances from which they are formed. The coatings, therefore, should be more compatible with the body.

The antithrombogenic material used in the present invention is provided in the form of a vapor in the presence of a substrate in the reactor. The vapor pressure of the material in the reactor may vary. It should be sufficiently high to deposit a continuous coating on the substrate. It should not be so high, however, as to cause a gas phase reaction rather than a surface photopolymerization. Generally, to avoid a gas phase reaction, the maximum pressure of the vapor in the reactor should be less than about 10 torr and preferably less than 2 torr. The particular vapor pressure used generally depends on the particular antithrombogenic material used.

Ultraviolet light from any source and of any type can be used. Suitable light sources include carbon arcs, high-pressure mercury vapor lamps, fluorescent lamps, argon glow lamps, and photographic flood lamps.

The ultraviolet light source need only furnish an effective amount of light of the required wave length for a particular vapor. This is determinable empirically. In the present invention, the useful ultraviolet wave length generally ranges from about 1,800 A. to about 4,000 A. A majority of commercially available ultraviolet lamps usually emit effective amounts of light in this range as, for example, a 700 watt Hanovia lamp.

The present process can be carried out in a number of different types of enclosures of reactors. The reactor, however, should be gastight to insure sufficient buildup of vapor pressure therein to achieve a continuous polymerized film.

In carrying out the present process, the substrate to be coated is placed within the reactor so that the substrate surface to be coated receives the light emitted by the ultraviolet lamp. The rate at which the coating is formed is proportional to the intensity of the light as well as the vapor pressure of the material within the reactor at less than 2 torr. In some instances, when desirable, the substrate may be cooled by conventional means such as a copper block provided with cooling means to promote formation of the coating.

The present coating can be formed on a wide variety of substrates of various forms of solid, porous, and woven materials, and of varying compositions including metals and nonmetals to form the coated article of this invention. Typical substrate forms include sheets, tubes, and fibers. Representative metallic substrates useful as prosthetic forms or medical inserts are stainless steel and aluminum. Examples of nonmetallic substrates useful as prosthetic forms include polytetrafluoroethylene sold under the trademark Teflon and polyethylene terepthalate sold under the trademark Dacron.

The coatings produced by the present invention are adherent, continuous and substantially uniform in thickness. The present thin coatings are particularly useful to maintain the geometry of machined parts such as heart valves as well as to impart antithrombogenic properties to these parts. If desired, a mask may be used to cover certain portions of the substrate surface to be coated to produce a coating having a predetermined pattern. The mask can be formed of a conventional material such as stainless steel.

The coated articles of the present invention exhibit antithrombogenic behavior. They are particularly useful as prosthetic materials and in blood-transporting equipment.

The invention is further illustrated by the following examples. In all of the following examples, the procedure used was as follows unless otherwise noted:

Ultraviolet light was provided by a 700 watt Hanovia lamp, Model No. 674A which emitted ultraviolet light of wave length ranging from about 1849 A. to about 13,673 A. Specifically, it emitted $\approx$ 17 watts of light of wave length of about 1,849 to 2,400 A. and $\approx$ 131 watts of wave length of 2,400 A. to 3,360 A. in the ultraviolet. The lamp was provided with a reflector. This lamp was capable of heating the reactor system to about 200° C.

The reactor was a quartz tube which was about 23 cm. long and 3.5 cm. in diameter. The quartz tube was maintained in a horizontal position and the ultraviolet lamp was located about 5 cm. above its central portion. This quartz was transparent to light of wave length greater than 1,800 A. The reactor was provided with a copper substrate holder which extended along most of the length of the reactor tube and was located centrally therein.

A standard bridge technique with a mercury drop electrode of 0.1 cm² as counterelectrode in several areas was used to determine capacitance.

THe dissipation factor was determined by standard techniques.

All glass slides and evaporated aluminum coated glass slides used as substrates were standard microscope slides, i.e. 1 inch wide, 3 inches long and 1/32 inch thick.

Example 1

In this example the antithrombogenic compound was 2-p-phenylsulfonylphenylindanedione-1,3, which is a solid. Two standard glass microscope slides, one of which was coated with evaporated aluminum, were used as substrates.

The slides were placed side by side in the reactor on top of the substrate holder. The slides were centrally located so that they received the light emitted by the ultraviolet lamp. A small ceramic boat containing about 1 gram of the 2-p-phenylsulfonylphenylindanedione-1, 3 was placed within the quartz tube reactor.

The reactor was evacuated to a substantial vacuum of less than 1 micron. A heat gun was then applied to the ceramic boat to partially vaporize the indanedione compound. The reactor system as well as the indanedione compound source were heated to about 170° C. After about 3 minutes at a temperature of about 170° C, the compound vaporized to raise the vapor pressure within the reactor to about 0.06 torr.

The ultraviolet lamp was then turned on for a period of 50 minutes. During this entire irradiation period, the vapor pressure within the reactor was maintained at about 0.06 torr by maintaining the temperature of the indanedione compound at about 170° C. by periodic application of the heat gun to the ceramic boat. During the irradiation period, the temperature of the glass slides was determined to be about 180° C. The lamp was then turned off and the reactor system allowed to cool to room temperature.

The glass slides were then removed from the reactor and examined. A faint brownish film was visible on both slides. The beading behavior of water drops on both slides indicated the presence of a coating thereon. Capacitance measurements indicated that the coating on the evaporated aluminum glass slide must be less than 500 A. thick, indicating a film growth rate of < 10 A./min.

Example 2

In this example the antithrombogenic compound was 2-phenyl-1,3-indanedione, which is a solid and commercially available. Two standard glass microscope slides, one of which was coated with evaporated aluminum, were used as substrates. A suture material made of woven Teflon and about 3 inch long, ¼inch wide and ⅛inch thick was also used as a substrate.

The substrates were placed side by side in the reactor on top of the substrate holder. The substrates were centrally located so that they received the light emitted by the ultraviolet lamp. A small ceramic boat containing about 1 gram of the 2-pheny-1,3-indanedione was placed within the quartz tube reactor.

The reactor was evacuated to a substantial vacuum of less than one micron. A heat gun was then applied to the ceramic boat to partially vaporize the indanedione compound. The indanedione compound source was heated to a temperature of 100°–145° C. After about 3 minutes, the compound vaporized to raise the vapor pressure within the reactor to about 0.1 to 0.2 torr.

The ultraviolet lamp was then turned on for a period of 60 minutes. During this entire irradiation period, the vapor pressure within the reactor was maintained at about 0.2 torr by maintaining the temperature of the indanedione compound at about 145° C. by periodic application of the heat gun to the ceramic boat. During the irradiation period, the temperature of the substrate was determined to be about 180° C. The lamp was then turned off and the reactor system allowed to cool to room temperature.

The substrates were then removed from the reactor and examined. A yellow-brown coating was visible on each exposed surface of each substrate. The coating was firmly adherent to all the substrates and could not be rubbed off with a cloth or with one's fingers.

The capacitance of the yellow-brown coating on the evaporated aluminum glass slide averaged 7×10⁻⁹ farads indicating that the coating was electrically continuous and imperforate. Assuming a dielectric constant of 3, the thickness was 390 A. indicating a growth rate of ≈ 6A./min. The dissipation factor at 1,000 c.p.s. averaged 10 percent indicating that polar groups were retained in the coating. The yellow-brown coating on all of the substrates was soluble in acetone.

Example 3

The procedure used in this example was the same as that disclosed in example 2 except that the irradiation period was 80 minutes. A yellow-brown coating was visible on each exposed surface of all the substrates.

The capacitance of the yellow-brown coating on the evaporated aluminum glass slide was determined to be 5.4×10⁻⁹ farads indicating that the coating was electrically continuous and imperforate. A thickness of 500 A. again indicated a growth rate of ≈ 6 A./min. The dissipation factor of this coating on the evaporated aluminum glass slide at 1,000 c.p.s. was 8.0 percent indicating that polar groups were retained in the coating.

Example 4

In this example, the antithrombogenic properties of both the yellow-brown coated glass microscope slides prepared in example 3 were determined and compared to the same type of glass slides which were not treated according to the present invention.

In these tests, a few drops of freshly drawn human venous blood were placed on the surface of each slide. The drops on each slide were stirred periodically at the same time with a fine stainless steel needle in order to note the time of first fibrin formation and then the time of gross clotting. The results were as follows:

| | Clotting Begins | Major Portion Clotted |
|---|---|---|
| Uncoated slides (controls) | | |
| Glass Slide | 6 min. | 10 min. |
| Evaporated Aluminum Coated Glass Slide | 6 min. | 10 min. |
| Coated Slides of example 3 | | |
| Glass Slide | 15 min. | 19 min. |
| Evaporated Aluminum Coated Slide | 11 min. | 19 min. |

The table illustrates that the two slides coated in example 3 have significantly better antithrombogenic properties than the control slides, i.e. the slides not coated according to the present invention. The blood was then wiped off all the slides. The coating on the slides of example 3 remained continuous and firmly adherent. The above blood clotting test was then repeated and the same results were obtained.

Example 5

In this example, the antithrombogenic properties of the brownish-coated evaporated aluminum glass slide of example 1 were determined in the same manner as set forth in example 4. The time for gross clot formation was increased from 10 to 13 minutes.

Example 6

In this example the antithrombogenic compound was P-aminobenzoic acid which is a solid. Two standard glass microscope slides, one of which was coated with evaporated aluminum, were used as substrates.

The slides were placed side by side in the reactor on top of the substrate holder. The slides were centrally located so that they received the light emitted by the ultraviolet lamp. A small ceramic boat containing about 1 gram of the p-aminobenzoic acid was placed within the quartz tube reactor.

The reactor was evacuated to a substantial vacuum of less than 1 micron. A heat gun was then applied to the ceramic boat to vaporize the p-aminobenzoic acid. The reactor system as well as the compound source were heated to about 150° C. After about 3 minutes at a temperature of about 150° C., the compound vaporized to raise the vapor pressure within the reactor to about 0.2 torr.

The ultraviolet lamp was then turned on for a period of 110 minutes. During this entire irradiation period, the vapor pressure within the reactor was maintained at about 0.2 torr by maintaining the temperature of the compound at about 170° C. by periodic application of the heat gun to the ceramic boat. During the irradiation period, the temperature of the glass slides was determined to be about 180° C. The lamp was then turned off and the reactor system allowed to cool to room temperature.

The glass slides were then removed from the reactor and examined. A cloudy film was visible on the plain glass slide and a brownish coating was visible on the evaporated aluminum glass slide. Three capacitance measurements of the brownish coating on the evaporated aluminum glass slide averaged 1.5 $\times 10^{-9}$ farads indicating that the coating was electrically continuous and imperforate. Three measurements of the dissipation factor of this brownish coating averaged 68 percent indicating that polar groups are retained in the coating.

Assuming a dielectric constant of 3, the average thickness of the brownish coating is about 1,820 angstroms with a growth rate of about 16 angstroms per minute.

Example 7

In this example the antithrombogenic compound was salicylic acid which is a solid. Two standard glass microscope slides, one of which was coated with evaporated aluminum, were used as substrates.

The slides were placed side by side in the reactor on top of the substrate holder. The slides were centrally located so that they received the light emitted by the ultraviolet lamp. A small ceramic boat containing about 1 gram of the salicylic acid was placed within the quartz tube reactor.

The reactor was evacuated to a substantial vacuum of less than one micron. A heat gun was then applied to the ceramic boat to vaporize the salicylic acid. The reactor system as well as the salicylic acid were heated to about 150° C. After about 3 minutes at a temperature of about 150° C., the compound vaporized to raise the vapor pressure within the reactor to about 0.2 torr.

The ultraviolet lamp was then turned on for a period of 60 minutes. During this entire irradiation period, the vapor pressure within the reactor was maintained at about 0.2 torr by maintaining the temperature of the salicylic acid at about 170° C. by periodic application of the heat gun to the ceramic boat. During the irradiation period, the temperature of the glass slides was determined to be about 180° C. The lamp was then turned off and the reactor system allowed to cool to room temperature.

The glass slides were then removed from the reactor and examined. An almost colorless coating had formed on the plain glass slide and a yellow coating had formed on the evaporated aluminum glass slide. Three capacitance measurements of the yellow coating on the evaporated aluminum glass slide averaged 0.41 $\times 10^{-9}$ farads indicating that the coating was electrically continuous and imperforate. Three measurements of the dissipation factor of this yellow coating all measured 0.92 percent indicating in this particular instance a relatively low level of polarity in polymeric film.

Assuming a dielectric constant of 3, the average thickness of the brownish coating was about 6,700 angstroms with a growth rate of about 110 angstroms per minute.

In copending U.S. Pat. application Ser. No. 20,816 entitled "Antithrombogenic Article And Process," filed of even date herewith in the name of Archibald N. Wright and assigned to the assignee hereof, there is disclosed a process for producing an antithrombogenic article by providing an antithrombogenic natural material in the form of a vapor in the presence of a substrate, and subjecting the vapor to ultraviolet light to surface photopolymerize it onto the substrate.

What is claimed is:

1. A process for producing an antithrombogenic article comprised of a substrate coated with a surface photopolymerized vapor of a synthetic organic antithrombogenic compound which comprises providing a synthetic organic antithrombogenic compound and a substrate within a substantial vacuum, heating said synthetic organic antithrombogenic compound to produce a vapor of said compound having a vapor pressure of less than 10 torr without significantly degarding said compound, said synthetic organic antithrombogenic compound being vaporizable by heating in a substantial vacuum to produce a vapor pressure of less than 10 torr without being significantly degraded, and subjecting said vapor to ultraviolet light ranging in wavelength from about 1,800 angstroms to about 4,000 angstroms to surface photopolymerize said vapor onto said substrate to produce an adherent continuous antithrombogenic coating thereon.

2. A process according to claim 1 wherein said synthetic organic antithrombogenic compound is selected from the group consisting of an anticoagulant compound and a fibrinolytic compound.

3. A process according to claim 1 wherein said synthetic organic antithrombogenic compound is vinyl substituted.

4. A process according to claim 2 wherein said anticoagulant compound is selected from the group consisting of bishydroxycoumarin, ethyl biscoumacetate, 3-(alpha-acetonylbenzyl)-4-hydroxycoumarin, 2-phenylindane-1,3-dione, 2[p- P-(phenylsulfonyl) phenyl]-1,3-indanedione, and 2-diphenylacetyl-1,3-indanedione.

5. A process according to claim 2 wherein said fibrinolytic compound is selected from the group consisting of ε-aminocaproic acid, p-aminobenzoic acid, salicylic acid, aspirin, phenylbutazone, urethane, dextran, chlorpheniramine, and dipyridamole.

6. A process according to claim 1 wherein said substrate is a metal.

7. A process according to claim 1 wherein said substrate is a nonmetal.

8. An antithrombogenic article comprised of a substrate the surface of which is coated with an adherent continuous thin coating of a surface photopolymerized vapor of a synthetic organic antithrombogenic compound, said synthetic organic antithrombogenic compound being vaporizable in a substantial vacuum by heat without being significantly degraded to produce a vapor pressure of less than 10 torr.

9. An antithrombogenic article according to claim 8 wherein said synthetic organic antithrombogenic compound is selected from the group consisting of an anticoagulant compound and a fibrinolytic compound.

10. An antithrombogenic article according to claim 9 wherein said anticoagulant compound is selected from the group consisting of bishydroxycoumarin, ethyl biscoumacetate, 3-(alpha-acetonylbenzyl)-4-hydroxycoumarin, 2-phenylindane- 1,3-dione, 2[p-(phenylsulfonyl) phenyl]-1,3-indanedione, and 2-diphenylacetyl-1,3-indanedione.

11. An antithrombogenic article according to claim 9 wherein said fibrinolytic compound is selected from the group consisting of ε-aminocaproic acid, p-aminobenzoic acid, salicylic acid, aspirin, phenylbutazone, urethane, dextran, chlorpheniramine, and dipyridamole.

12. An antithrombogenic article according to claim 8 wherein said substrate is a metal.

13. An antithrombogenic article according to claim 8 wherein said substrate is a nonmetal.

* * * * *